(12) United States Patent
Ueno et al.

(10) Patent No.: US 11,225,919 B2
(45) Date of Patent: Jan. 18, 2022

(54) SUPERCHARGING PRESSURE SETTING APPARATUS

(71) Applicant: Honda Motor Co., Ltd., Tokyo (JP)

(72) Inventors: Masaki Ueno, Wako (JP); Akihiro Katsuura, Wako (JP); Kenichiro Asai, Wako (JP); Kentaro Miki, Wako (JP); Katsuya Shinjo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/064,999

(22) Filed: Oct. 7, 2020

(65) Prior Publication Data

US 2021/0115864 A1 Apr. 22, 2021

(30) Foreign Application Priority Data

Oct. 16, 2019 (JP) .............................. JP2019-189536

(51) Int. Cl.
*F02D 41/00* (2006.01)
*F02B 37/18* (2006.01)
*F02D 41/18* (2006.01)

(52) U.S. Cl.
CPC .......... *F02D 41/0007* (2013.01); *F02B 37/18* (2013.01); *F02D 41/18* (2013.01); *F02D 2200/0402* (2013.01)

(58) Field of Classification Search
CPC ...... F02D 41/0007; F02D 41/18; F02B 37/18; F02B 37/22
See application file for complete search history.

(56) References Cited

U.S. PATENT DOCUMENTS

| | | | |
|---|---|---|---|
| 6,279,551 B1 * | 8/2001 | Iwano | F02B 37/18 123/564 |
| 2006/0117751 A1 * | 6/2006 | Todoroki | F02B 37/001 60/612 |
| 2006/0213194 A1 * | 9/2006 | Hasegawa | F02D 11/105 60/602 |
| 2014/0034026 A1 * | 2/2014 | Katsumata | F02D 41/18 123/559.1 |
| 2016/0003133 A1 * | 1/2016 | Mihara | F02D 41/18 123/568.11 |

FOREIGN PATENT DOCUMENTS

JP 2006097559 A 4/2006
JP 5182436 B2 4/2013

* cited by examiner

*Primary Examiner* — Ngoc T Nguyen
(74) *Attorney, Agent, or Firm* — Duft & Bornsen, PC

(57) ABSTRACT

A supercharging pressure setting apparatus, includes: an engine mounted on a vehicle; a supercharger compressing an intake air introduced to the engine; a supercharger actuator adjusting a supercharging pressure to a target supercharging pressure; and a processor. The processor acquires an intake air amount to the engine; acquires a target intake air amount to the engine; sets the target supercharging pressure based on an operation state of the vehicle; determines whether the operation state of the vehicle is one of an accelerating state and a transition state to the accelerating state; and calculates a difference between the intake air amount and the target intake air amount. The processor sets the target supercharging pressure based on the difference when it is determined that the operation state of the vehicle is one of the accelerating state and the transition state.

12 Claims, 5 Drawing Sheets

SUPERCHARGING PRESSURE SETTING APPARATUS

CROSS-REFERENCE TO RELATED APPLICATION

This application is based upon and claims the benefit of priority from Japanese Patent Application No. 2019-189536 filed on Oct. 16, 2019, the content of which is incorporated herein by reference.

BACKGROUND OF THE INVENTION

Field of the Invention

This invention relates to a supercharging pressure setting apparatus for setting supercharging pressure.

Description of the Related Art

An apparatus has been known that adjusts supercharging pressure by changing opening degree of a waste gate valve using an electric actuator (for example, disclosed in Japanese Patent No. 5182436 (JP5182436B2)). In the apparatus described in JP5182436B2, a map representing the correspondence between the manipulation amount and the estimated opening of the waste gate valve is modified based on the difference between the intake flow rate calculated based on the estimated opening of the waste gate valve and the intake flow rate measured by the air flow meter.

However, in the configuration having supercharger as in the apparatus of JP5182436B2, overshoot of torque may occur due to excessive supercharging in a state such as a transient state shifting from a vehicle decelerating state, where fuel injection is stopped, to a vehicle accelerating state.

SUMMARY OF THE INVENTION

An aspect of the present invention is a supercharging pressure setting apparatus, including: an internal combustion engine mounted on a vehicle; a supercharger configured to compress an intake air introduced to the engine; a supercharger actuator configured to adjust a supercharging pressure of the supercharger to a target supercharging pressure; and a processor and a memory coupled to the processor. The processor is configured to perform: acquiring an intake air amount introduced to the engine; acquiring a target intake air amount introduced to the engine; setting the target supercharging pressure based on an operation state of the vehicle; determining whether the operation state of the vehicle is one of an accelerating state and a transition state to the accelerating state; and calculating a difference between the intake air amount and the target intake air amount acquired in the acquiring. The processor is configured to perform: the setting including setting the target supercharging pressure based on the difference calculated in the calculating when it is determined in the determining that the operation state of the vehicle is one of the accelerating state and the transition state to the accelerating state.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
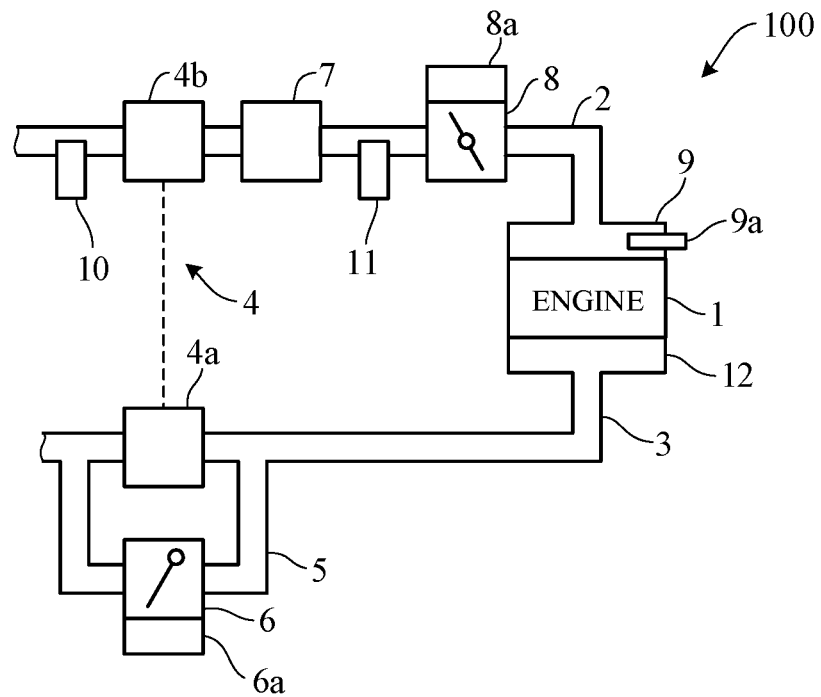
FIG. 1 is a diagram schematically illustrating a configuration of a supercharging pressure setting apparatus according to an embodiment of the present invention, and a periphery thereof.

An embodiment of the present invention is explained with reference to FIG. 1 to FIG. 6 in the following. FIG. 1 is a diagram schematically illustrating a configuration of a supercharging pressure setting apparatus (apparatus) 100 according to the embodiment of the present invention, and a periphery thereof. The apparatus 100 has an internal combustion engine (engine) 1, such as a gasoline engine or a diesel engine mounted on a vehicle (not shown), e.g. a spark-ignited four-cycle engine with a plurality of cylinders (for example, four cylinders). As shown in FIG. 1, an intake passage 2 through which intake air sucked into the engine 1 passes and an exhaust passage 3 through which exhaust gas combusted in the engine 1 passes are connected to the engine 1.

The exhaust passage 3 is provided with a turbine 4a which is rotationally driven by the exhaust gas. The intake passage 2 is provided with a compressor 4b coaxially with the turbine 4a for pumping the intake air sucked through an air cleaner (not shown). That is, the turbine 4a and the compressor 4b constitute a supercharger 4 for supercharging the intake air. A bypass passage 5 for bypassing exhaust gas from the upstream side to the downstream side of the turbine 4a is provided in the upstream and downstream the exhaust passage 3 of the turbine 4a, and a waste gate valve 6 for opening and closing the bypass passage 5 is provided in the bypass passage 5.

Figure 4:
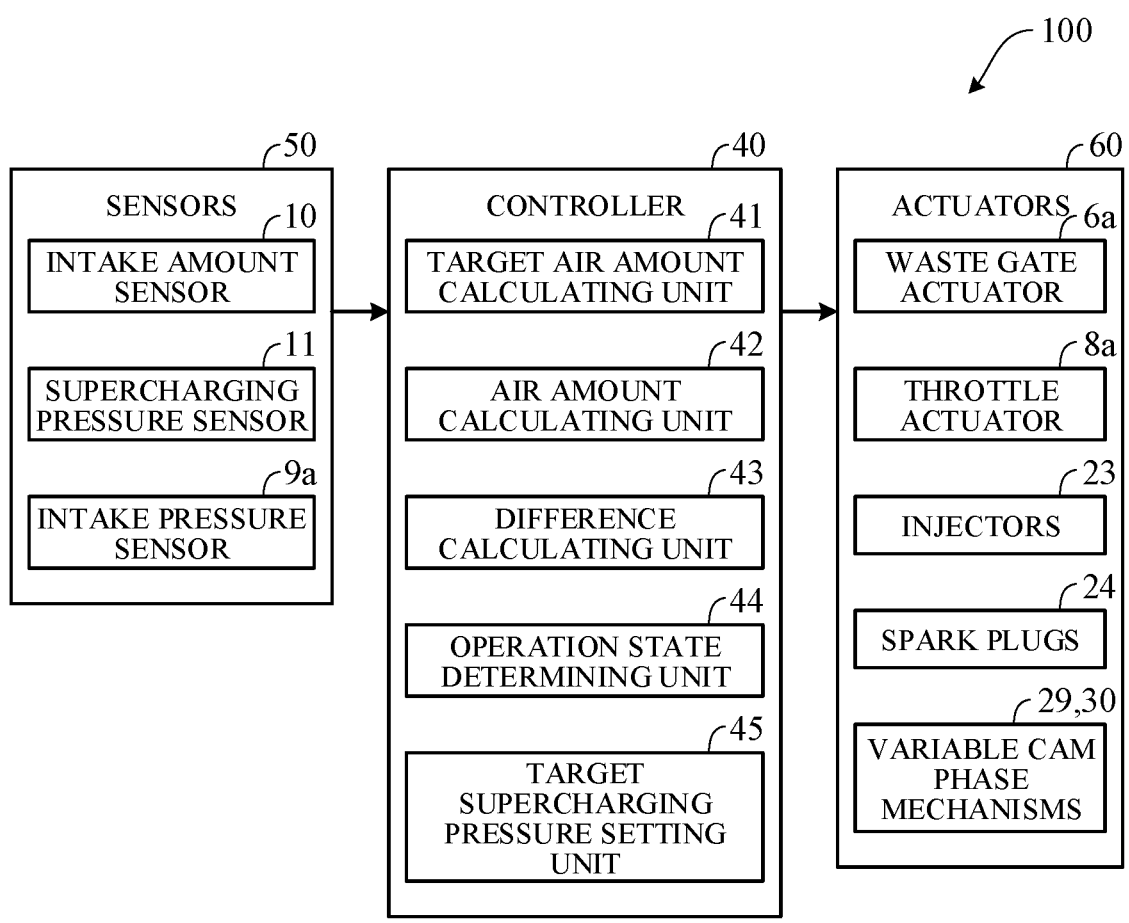
FIG. 4 is a block diagram schematically showing a configuration of a main part of the supercharging pressure setting apparatus according to the embodiment of the present invention.

The waste gate valve 6 is constituted, for example, by a flap-valve, and an opening of the waste gate valve 6 is changed by the actuation of a waste gate actuator 6a which is actuated by electric signals. By changing the opening of the waste gate valve 6, the flow rate of exhaust gas passing through the turbine 4a is changed, and the rotational speeds of the turbine 4a and the compressor 4b are changed, thereby adjusting a supercharging pressure by the supercharger 4. The operation of the waste gate actuator 6a is controlled by a controller 40 (FIG. 4).

The intake passage 2 downstream of the compressor 4b is provided with an intercooler 7 for cooling the intake air, a throttle valve 8 for regulating an amount of the intake air (intake amount) and an intake manifold 9 for distributing the intake air passing through the throttle valve 8 to the cylinders. The throttle valve 8 is constituted, for example, by a butterfly valve, and an opening of the throttle valve 8 is changed by driving a throttle actuator 8*a* operated by electric signals. The operation of the throttle actuator 8*a* is controlled by the controller 40 (FIG. 4).

The upstream side of the compressor 4*b* is provided with an intake amount sensor 10 for detecting an intake amount M on the upstream side, for example, as a mass flow rate per unit time. The intake amount sensor 10 is constituted, for example, by a hot wire type air flow meter. Between the intercooler 7 and the throttle valve 8, there is provided a supercharging pressure sensor 11 for detecting an intake pressure (supercharging pressure) P after being compressed by the compressor 4*b*, and the intake manifold 9 is provided with an intake pressure sensor 9*a* for detecting an intake pressure in the intake manifold 9. The supercharging pressure sensor 11 and the intake pressure sensor 9*a* are constituted, for example, by a semiconductor-pressure sensor. Although not shown, the intake passage 2 is also provided with an atmospheric temperature sensor for detecting an intake temperature (atmospheric temperature) and an atmospheric pressure sensor for detecting an intake pressure (atmospheric pressure) upstream of the compressor 4*b*.

The exhaust passage 3 is provided with an exhaust manifold 12 for collecting exhaust gas exhausted from the cylinders of the engine 1. Although not shown, the exhaust passage 3 is provided with an LAF sensor for detecting an air fuel ratio, an exhaust temperature sensor for detecting an exhaust temperature, an exhaust pressure sensor for detecting an exhaust pressure, and the like, downstream of the exhaust manifold 12.

Figure 2:
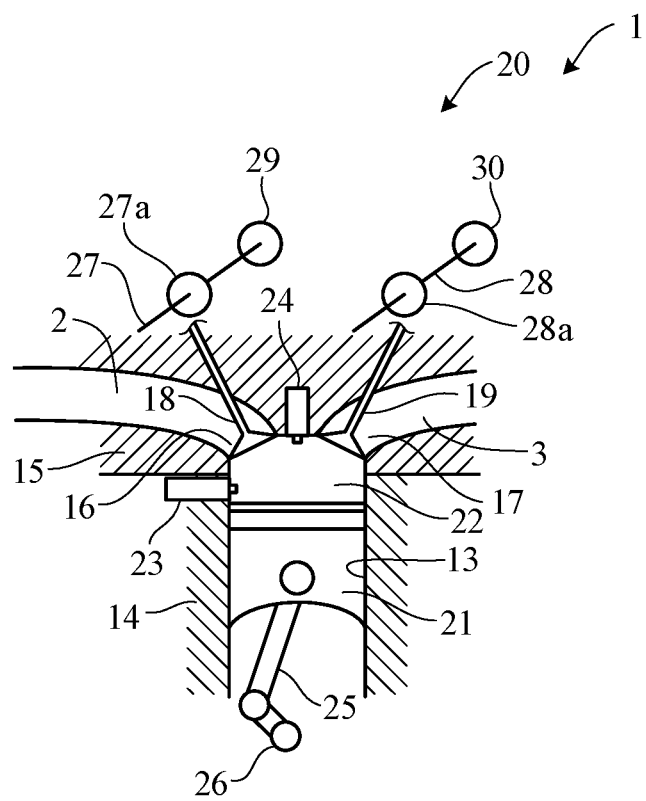
FIG. 2 is a diagram schematically showing a configuration of a main part inside the engine in FIG. 1.

FIG. 2 is a diagram schematically showing a configuration of a main part inside the engine 1. As shown in FIG. 2, the engine 1 has a cylinder block 14 in which a plurality of cylinders 13 is formed and a cylinder head 15 covering the top of the cylinder block 14. The cylinder head 15 is provided with an intake port 16 communicating with the intake passage 2 and an exhaust port 17 communicating with the exhaust passage 3. The intake port 16 is provided with an intake valve 18 for opening and closing the intake port 16, and the exhaust port 17 is provided with an exhaust valve 19 for opening and closing the exhaust port 17. The intake valve 18 and the exhaust valve 19 are driven to open and close by a variable valve mechanism 20.

In each cylinder 13, a piston 21 is disposed so as to be slidable in the cylinder 13, and a combustion chamber 22 is formed so as to face the piston 21. Injectors 23 are provided on the engine 1 so as to face each of the combustion chambers 22, and the injector 23 injects fuel into the combustion chamber 22. Instead of configuring the injector 23 as a direct injection type that injects fuel into the combustion chamber 22, it may be configured as a port injection type that injects fuel into the intake port 16. The engine 1 is further provided with spark plugs 24 and an air fuel mixture in the combustion chamber 22 is ignited by the spark plug 24. When the air fuel mixture combusts (explodes) in the combustion chamber 22, the piston 21 reciprocates along the inner wall of the cylinder 13 and a crank shaft 26 rotates through a connecting rod 25. The operation (injection timing, injection time period) of the injector 23 and the operation (ignition timing) of the spark plug 24 are controlled by the controller 40 (FIG. 4).

The variable valve mechanism 20 has an intake camshaft 27 and an exhaust camshaft 28. The intake camshaft 27 integrally has intake cams 27*a* respectively corresponding to each cylinder 13, and the exhaust camshaft 28 integrally has exhaust cams 28*a* respectively corresponding to each cylinder 13. The intake camshaft 27 and the exhaust camshaft 28 are connected to the crank shaft 26 via a timing belt (not shown), and each time the crank shaft 26 rotates twice, they rotate once. The intake valves 18 open and close at predetermined timings corresponding to the profile of the intake cam 27*a* through intake rocker arms (not shown) by rotating the intake camshaft 27. The exhaust valves 19 open and close at predetermined timings corresponding to the profile of the exhaust cam 28*a* through exhaust rocker arms (not shown) by rotating the exhaust camshaft 28.

The variable valve mechanism 20 further has variable cam phase mechanisms 29, 30 for changing relative cam phases of the intake cam 27*a* and the exhaust cam 28*a* relative to the crank shaft 26, respectively. The variable cam phase mechanism 29, 30 is provided at one end of each of the intake camshaft 27 and the exhaust camshaft 28. The configurations of the variable cam phase mechanisms 29, 30 are the same as each other, and the configuration of the variable cam phase mechanism 30 for intake will be described as a typical example. Although not shown in detail, the variable cam phase mechanism 30 has a rotatable cylindrical housing that rotatably accommodates the intake camshaft 27 and defines an advance chamber and a retard chamber, and a timing belt that passes through the crank shaft 26 is wound around the outer circumferential surface of the housing.

The advance chamber and the retard chamber, for example, are supplied with hydraulic pressure from the hydraulic pump corresponding to drive of control valves; it is possible to change the cam phase of the intake cam 27*a* steplessly advance side or retard side by controlling drive of the control valves, thereby changing the opening and closing timing of the intake valve 18. That is, when the hydraulic pressure is supplied to the advance chamber, the intake camshaft 27 relatively rotates in one direction with respect to the housing, and the opening and closing timings of the intake valve 18 changes to the advance direction. On the other hand, when the hydraulic pressure is supplied to the retard chamber, the intake camshaft 27 relatively rotates in the other direction with respect to the housing, and the opening and closing timing of the intake valve 18 changes to the retarded direction.

The variable cam phase mechanisms 29, 30 operates so as to adjust the internal exhaust reflux rate when refluxing a portion of the exhaust gas (burnt gas) into the combustion chamber 22, i.e., the internal EGR gas rate. That is, by changing the opening and closing timings of the intake valve 18 and the exhaust valve 19 by the variable cam phase mechanisms 29, 30, the valve overlap amount in which the valve opening periods of the intake valve 18 and the exhaust valve 19 overlap is changed, thereby adjusting the amount of the internal EGR gas. The operation of the variable cam phase mechanisms 29, 30 is controlled by the controller 40 (FIG. 4).

Though not shown, the engine 1 is also provided with a crank angle sensor for detecting the rotational angle of the crank shaft 26 and the engine speed, cam angle sensors for detecting cam phases of the intake cams 27*a* and the exhaust cams 28*a* respectively, a water temperature sensor for detecting the coolant temperature of the engine 1 (engine water temperature), and the like.

In the engine 1 having such the supercharger 4, the intake air is sucked into the cylinders 13 of the engine 1 by the pressure difference between the atmospheric pressure and the intake pressure in the intake manifold 9 in a light road zone to a middle road zone where supercharging by the supercharger 4 is not performed (natural intake zone). On the other hand, the intake air is pumped into the cylinders 13 of the engine 1 by the supercharging pressure P by the supercharger 4 in a heavy road zone where supercharging is performed by the supercharger 4 (supercharging zone).

In the natural intake zone, an output torque T is controlled by adjusting the opening of the throttle valve 8 via the throttle actuator 8a in accordance with a target torque T0 of the engine 1 and adjusting the intake amount M introduced into the cylinder 13. A target intake amount M0 and a target opening of the throttle valve 8 is determined based on characteristic maps set in advance in accordance with the target torque T0, the engine speed, and the like (feedforward control). The target opening of the throttle valve 8 is corrected such that the intake amount M detected by the intake amount sensor 10 is the target intake amount M0 (feedback control).

On the other hand, in the supercharging zone, the throttle valve 8 is fixed to a predetermined opening which is fully opened or near fully opened so that the intake amount M passing through the throttle valve 8 is maximized. Further, the supercharging pressure P by the supercharger 4 is adjusted via the waste gate actuator 6a in accordance with the target torque T0 of the engine 1, and the intake amount M introduced into the cylinders 13 is adjusted, thereby controlling the output torque T. A target supercharging pressure P0 and a target opening of the waste gate actuator 6a is determined based on characteristic maps set in advance in accordance with the target torque T0, the engine speed, and the like (feedforward control). The target opening of the waste gate actuator 6a is corrected such that the supercharging pressure P detected by the supercharging pressure sensor 11 is the target supercharging pressure P0 (feedback control).

As described above, in the supercharging zone, the throttle valve 8 is fixed to the fully open side, and only the feedback control of the supercharging pressure P by the supercharger 4 is performed, and the feedback control of the intake amount M is not performed. Therefore, the intake amount M may continuously deviate from the target intake amount M0.

Figure 3:
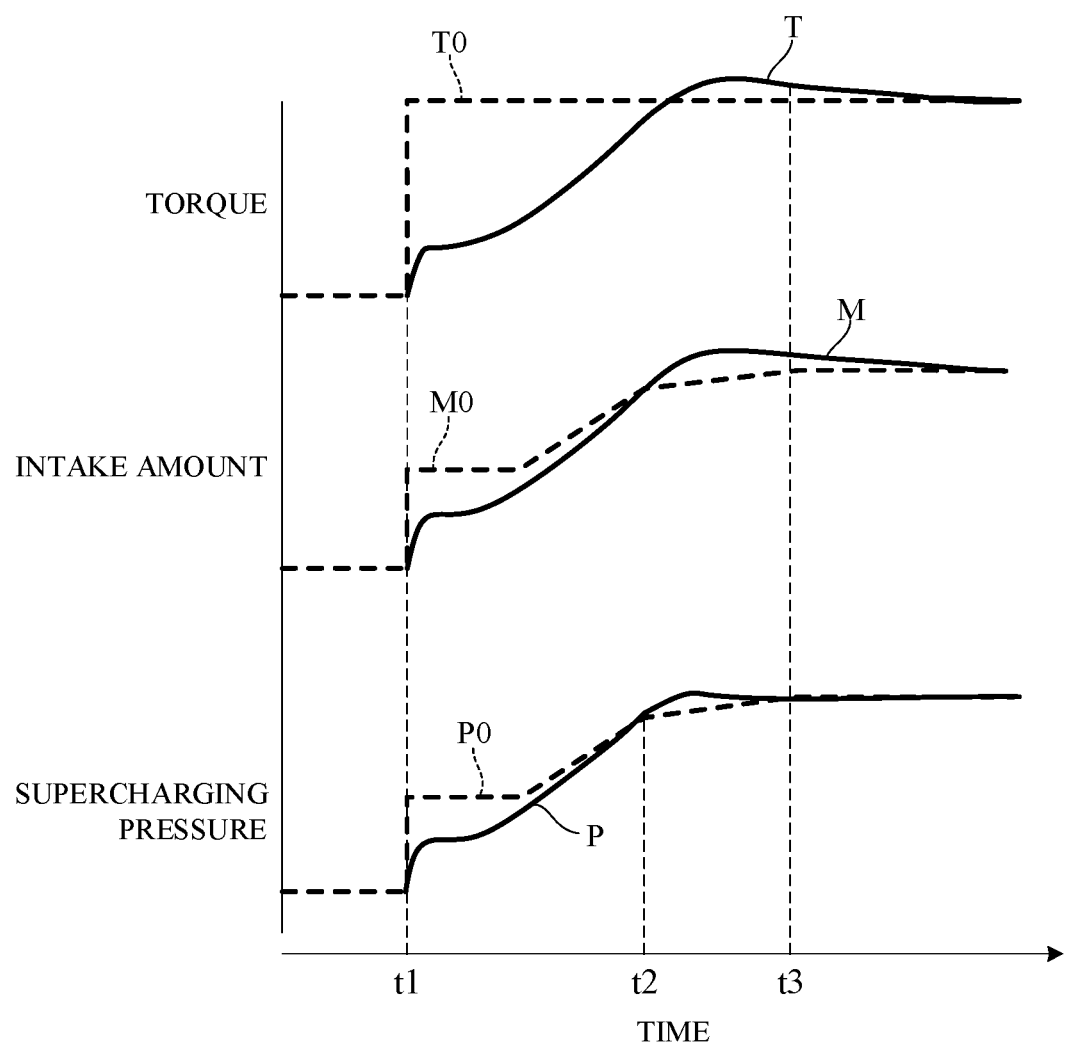
FIG. 3 is a diagram showing an exemplary change with time of torque, intake amount and supercharging pressure at a time of acceleration of a vehicle.

FIG. 3 is a diagram showing an exemplary change with time of the output torque T, the intake amount M and the supercharging pressure P at the time of acceleration of the vehicle, and shows the change with time at the time of transition from the decelerating state to the accelerating state. As shown in FIG. 3, when the accelerator pedal is depressed by the driver and the target torque T0 is determined at time t1, the target supercharging pressure P0 is determined, and the feedback control of the supercharging pressure based on the supercharging pressure P detected by the supercharging pressure sensor 11 is started. Thereafter, from time t1 to time t2, for example, the waste gate valve 6 is fully closed and supercharging is performed, and when the supercharging pressure P reaches the target supercharging pressure P0 at time t2, the intake amount M reaches the target intake amount M0 and the output torque T also reaches the target torque T0.

Thereafter, from time t2 to time t3, the supercharging pressure P exceeding the target supercharging pressure P0 gradually converges to the target supercharging pressure P0 due to the feedback control of the supercharging pressure P. However, the intake amount M, for which the feedback control is not performed, the overshooting state in which the target value is exceeded continues after the time t3, and as a result, the overshooting state continues for the output torque T.

This overshooting state of the intake amount M and the output torque T occurs particularly in a transient state after transition from a predetermined light road state, such as the decelerating state of the vehicle where fuel injection is stopped (fuel cut), to the accelerating state. In addition to the decelerating state with the fuel-cut, the predetermined light road state includes, for example, a state in which there is no operation of an acceleration operation member such as the accelerator pedal by the driver, or a state in which the operation amount is extremely small and the load on the engine 1 is extremely small. The target supercharging pressure P0 is determined on the basis of preset steady-state characteristic maps, but in a predetermined time period (for example, within thirty seconds) after such the predetermined light road state, the temperature in the cylinder 13 (in-cylinder temperature) is lowered to enhance the filling efficiency of the cylinder 13. Since more than expected amounts of the intake air are introduced into the cylinder 13 during acceleration or acceleration transitions within such periods, there is an increased likelihood of the intake amount M and the output torque T overshoot.

In this instance, the output torque with respect to the depression of the accelerator pedal changes depending on whether or not it is within the predetermined time period after the predetermined light road state, and an unintended acceleration for the driver is generated, which may give a sense of discomfort to the driver. Therefore, in the present embodiment, the apparatus 100 is configured as follows so as to suppress the overshoot of the torques by setting the target supercharging pressure based on the difference between the intake amount and the target intake amount in the transient state shifting from the predetermined light road state to the accelerating state.

FIG. 4 is a block diagram schematically showing a configuration of a main part of the apparatus 100. As shown in FIG. 4, the apparatus 100 mainly includes the controller 40, sensors 50 communicably connected to the controller 40, and actuators 60. The sensors 50 include various sensors that detect operation states of the engine 1 including the intake amount sensor 10, the supercharging pressure sensor 11 and the intake pressure sensor 9a described above. The actuators 60 includes, as described above, the waste gate actuator 6a, the throttle actuator 8a, the injectors 23, the spark plugs 24, the variable cam phase mechanisms 29, 30, and the like. Though not shown, various sensors mounted on the vehicle, other controllers, and the like are further connected to the controller 40, and a detection values, a command values, and the like of various parameters indicating the operation states of the vehicle, such as an accelerator opening and a vehicle speed, are inputted to the controller 40.

The controller 40 is constituted by an electronic control unit including a computer having a CPU (processor), ROM, RAM, and other peripheral circuitry. The controller 40 includes, as functional components, a target air amount calculating unit 41, an air amount calculating unit 42, a difference calculating unit 43, an operation state determining unit 44, and a target supercharging pressure setting unit 45. The CPU functions as the target air amount calculating unit 41, the air amount calculating unit 42, the difference calculating unit 43, the operation state determining unit 44, and the target supercharging pressure setting unit 45.

The target air amount calculating unit 41 calculates the target intake amount M0 to be introduced into the cylinders 13 of the engine 1 based on characteristic maps set in advance in accordance with the target torque T0 of the engine 1 determined in accordance with the accelerator opening, the engine speed, and the like.

The air amount calculating unit 42 calculates the intake amount M to be introduced into the cylinders 13 of the engine 1 based on a detection value of the intake amount sensor 10. The fuel injection into the cylinders 13 by the injectors 23 is controlled based on the intake amount M calculated by the air amount calculating unit 42 so that the air fuel ratio in the cylinders 13 becomes an appropriate value.

The difference calculating unit 43 calculates a difference ΔM between the intake amount M calculated by the air amount calculating unit 42 and the target intake amount M0 calculated by the target air amount calculating unit 41. For example, the difference ΔM between the intake amount M and the target intake amount M0 is calculated as a proportional term, a differential term, and an integral term of PID control.

The operation state determining unit 44 determines whether the operation state of the vehicle is the accelerating state or a transition state to the accelerating state, e.g., whether the target supercharging pressure P0 is equal to or greater than a predetermined pressure (for example, the atmospheric pressure); i.e., in the supercharging zone. The determination of the operation state of the vehicle by the operation state determining unit 44 is performed on the basis of detection values, command values, or the like of various parameters indicating the operation state of the vehicle, such as the accelerator opening and the vehicle speed.

In addition, the operation state determining unit 44 determines whether the supercharging pressure P reaches the target supercharging pressure P0 and maintains the supercharging pressure P in a predetermined range (for example, within ±five percent) with respect to the target supercharging pressure P0 for a predetermined time period or more (for example, one second or more) based on the supercharging pressure P detected by the supercharging pressure sensor 11. That is, it is determined whether it is a state in which: the target supercharging pressure P0 is reached; the supercharging pressure P is stabilized; and the target torque T0 is satisfied.

When it is determined by the operation state determining unit 44 that the operation state of the vehicle is the accelerating state or the transition state to the accelerating state and the supercharging pressure P reaches the target supercharging pressure P0 and is stable, the target supercharging pressure setting unit 45 sets the target supercharging pressure P0 based on the difference ΔM calculated by the difference calculating unit 43. That is, the larger the intake amount M over the target values M0, the lower the target supercharging pressure P0 is set (corrected), so that the overshooting state of the intake amount M and the output torque T exceeding the respective target values M0, T0 is resolved and converged to the target values M0, T0. In other words, the feedback control (for example, PID control) of the supercharging pressure P is performed based on the difference ΔM from the target intake amount M0 of the intake amount M.

Figure 5:
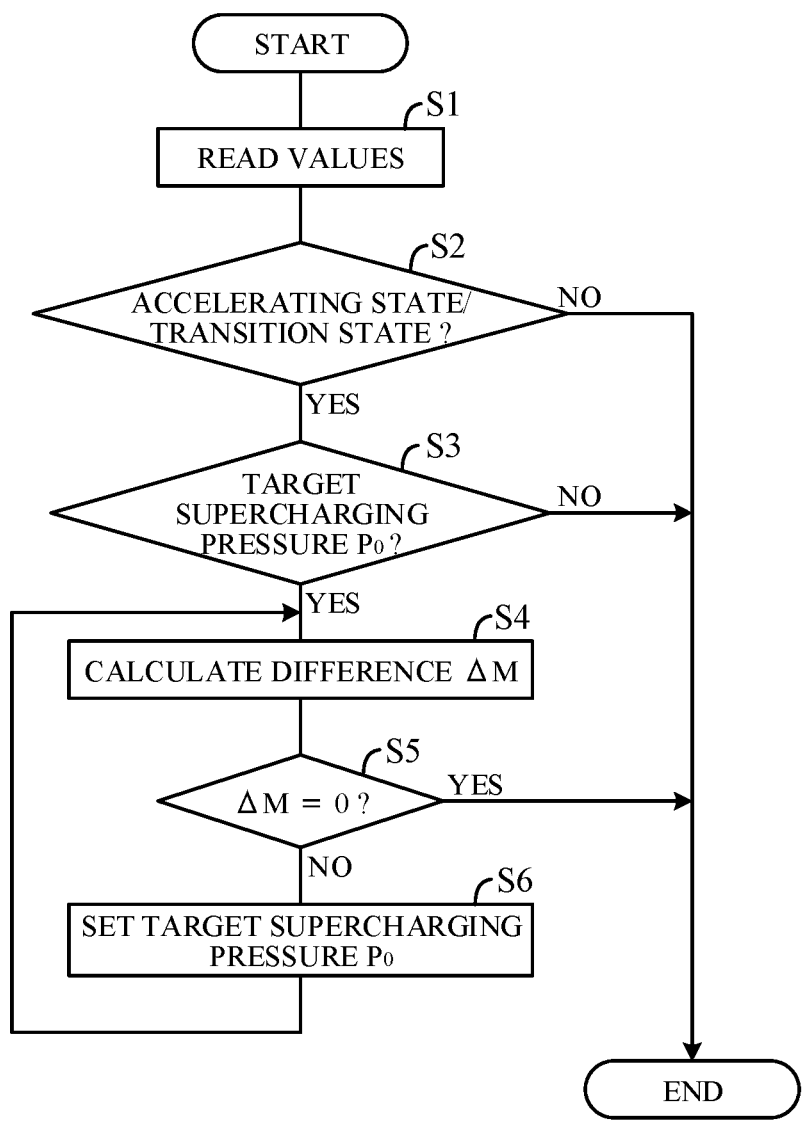
FIG. 5 is a flowchart illustrating an example of a process executed by the supercharging pressure setting apparatus according to the embodiment of the present invention.

FIG. 5 is a flowchart illustrating an example of a process executed by the controller 40 in accordance with a program stored in the memory in advance. The process shown in the flow chart is started when it is determined by a separate determination process that the operation state of the engine 1 is a normal operation state that is not a warm-up operation state or the like, and is repeated for each predetermined time period.

First, in S1 (S: processing Step), input values from the sensors 50 and output values to the actuators 60 are read. Next, in S2, it is determined whether the operation state of the vehicle is the accelerating state or the transition state to the accelerating state based on the target supercharging pressure P0. If the result is affirmative in S2, the process proceeds to S3, and if the result is negative, the process ends. In S3, it is determined whether the supercharging pressure P reaches the target supercharging pressure P0 and is stable. If the result is affirmative in S3, the process proceeds to S4, and if the result is negative, the process ends.

In S4, the difference ΔM from the target intake amount M0 of the intake amount M is calculated. Next, in S5, it is determined whether the difference ΔM calculated in S4 maintains the value within a predetermined range (for example, within ±five percent) with respect to 0 for a predetermined time period or more (for example, one second or more). If the result is negative in S5, the process proceeds to S6, and if the result is positive, the process ends. In S6, the target supercharging pressure P0 is set based on the difference ΔM calculated in S4 (feedback control, PID control). The process in S4 to S6 is repeated until affirmed at S5. When the result of the determination in S5 is affirmative and PID control is terminated, the integration term is reset and the process is terminated.

By setting (correcting, or feedback controlling) the target supercharging pressure P0 based on the difference ΔM between the intake amount M and the target intake amount M0, it is possible to solve the overshooting state where the intake amount M and the output torque T exceeds the target values M0, T0 (S4, S6). In addition, since the feedback control of the supercharging pressure P based on the difference ΔM from the target intake amount M0 of the intake amount M is performed only at the time of acceleration or at the time of acceleration transition, the calculation burden of the controller 40 is not excessively increased (S2). In addition, since the supercharging pressure P is limited after it reaches the target supercharging pressure P0 and is stabilized, it is possible to prioritize to reach the target torque T0 at an early stage (S3).

Figure 6:
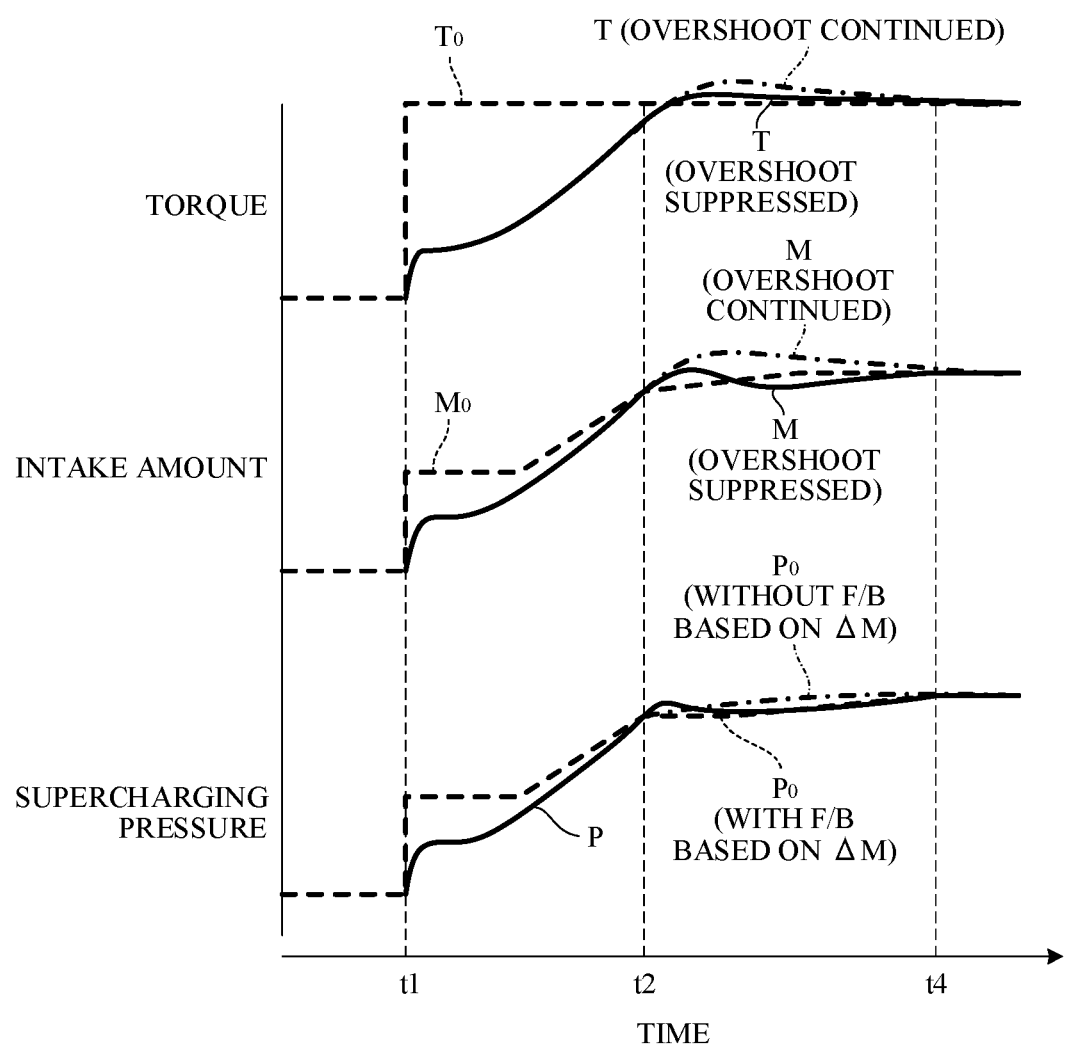
FIG. 6 is a diagram similar to FIG. 3 when a target supercharging pressure is set based on an intake amount difference by a target supercharging pressure setting unit in FIG. 4.

FIG. 6 is a diagram similar to FIG. 3 when the target supercharging pressure P0 is set based on the difference ΔM between the intake amount M and the target intake amount M0. As shown in FIG. 6, when the supercharging pressure P reaches the target supercharging pressure P0 at the time t2, the feedback control of the supercharging pressure P based on the difference ΔM of the intake amount M is performed until the time t4 at which the difference ΔM from the target intake amount M0 of the intake amount M is resolved. At this time, the target supercharging pressure P0 (dashed line) in the case where the feedback control based on the difference ΔM is performed is limited to a value lower than the value of the target supercharging pressure P0 (dashed-dotted line) in the case where the feedback control based on the difference ΔM is not performed. Since the feedback control of the supercharging pressure P based on the difference ΔM between the intake amount M and the target intake amount M0 is performed, the overshoot of the intake amount M and the output torque T is suppressed, and the output torque T converges to the target torque T0 earlier.

The present embodiment can achieve advantages and effects such as the following:

(1) The apparatus 100 includes: the engine 1 mounted on the vehicle; the supercharger 4 mounted on the vehicle and configured to compress the intake air introduced to the engine 1; the air amount calculating unit 42 configured to calculate the intake amount M introduced to the engine 1; the target air amount calculating unit 41 configured to calculate the target intake amount M0 introduced to the engine 1; the target supercharging pressure setting unit 45 configured to set the target supercharging pressure P0 based on the operation state of the vehicle; the waste gate valve 6 configured to adjust the supercharging pressure P to the target supercharging pressure P0 set by the target supercharging pressure setting unit 45; the operation state determining unit 44 configured to determine whether the operation state of the vehicle is one of the accelerating state and the transition state to the accelerating state; and the difference calculating unit 43 configured to calculate the difference ΔM between the intake amount M calculated by the air amount calculating unit 42 and the target intake amount M0 calculated by the target air amount calculating unit 41 (FIG. 1, FIG. 4).

The target supercharging pressure setting unit 45 is configured to set the target supercharging pressure P0 based on the difference ΔM calculated by the difference calculating unit 43 when it is determined by the operation state determining unit 44 that the operation state of the vehicle is one of the accelerating state and the transition state to the accelerating state. That is, since the supercharging pressure P is the feedback controlled based on the difference ΔM from the target intake amount M0 of the intake amount M, it is possible to suppress the overshoot of the intake amount M and the output torque T even in the supercharging zone where the opening of the throttle valve 8 is fixed in the vicinity of the full opening.

(2) The operation state determining unit 44 is configured to determine that the operation state of the vehicle is one of the accelerating state and the transition state to the accelerating state when the target supercharging pressure P0 set by the target supercharging pressure setting unit 45 is equal to or higher than the predetermined pressure. For example, in the supercharging zone where the target supercharging pressure P0 is the atmospheric pressure or more, it is determined that the operation state of the vehicle is the accelerating state or the transition state to the accelerating state.

(3) The apparatus 100 further includes: the throttle valve 8 configured to adjust the intake amount M introduced to the engine 1; and the controller 40 configured to control the throttle valve 8 so as to maximize the intake amount M introduced to the engine 1 when it is determined by the operation state determining unit 44 that the operation state of the vehicle is one of the accelerating state and the transition state to the accelerating state (FIG. 1, FIG. 4). In the supercharging zone of the heavy road zone, the opening of the throttle valve 8 is fixed in the vicinity of the full opening, and the intake amount introduced into the engine 1 is adjusted by the feedback control of the supercharging pressure P by the supercharger 4. In this instance, the intake amount M and the output torque T may continuously overshoot because the feedback control of the intake amount M is not performed. Therefore, by feedback controlling the supercharging pressure P based on the difference ΔM between the intake amount M and the target intake amount M0, it is possible to suppress the overshoot of the intake amount M and the output torque T.

(4) The apparatus 100 further includes: the supercharging pressure sensor 11 configured to detect the supercharging pressure P of the supercharger 4 (FIG. 1). The target supercharging pressure setting unit 45 is configured to start the setting of the target supercharging pressure P0 based on the difference ΔM calculated by the difference calculating unit 43 when it is determined by the operation state determining unit 44 that the operation state of the vehicle is one of the accelerating state and the transition state to the accelerating state and the supercharging pressure P detected by the supercharging pressure sensor 11 has reached to the target supercharging pressure P0. That is, since the supercharging pressure P is limited after reaching the target supercharging pressure P0, it is possible to prioritize reaching the target torque T0 at an early stage.

(5) The target supercharging pressure setting unit 45 is configured to set the target supercharging pressure P0 lower as the difference ΔM calculated by the difference calculating unit 43 is greater. That is, by setting the target supercharging pressure P0 lower as the intake amount M over the target intake amount M0 is larger, reducing the intake amount M and the output torque T to converge to the target values M0, T0, it is possible to solve the overshooting state.

Various modifications of the present embodiment are possible. Some examples are explained in the following. In the above embodiment, the configuration of the apparatus 100 and its surroundings is specifically shown in FIG. 1, but these are examples, and a supercharging pressure setting apparatus is not limited to this. For example, a supercharger may use a negative pressure waste gate valve instead of an electric waste gate valve. Further, instead of changing the exhaust flow rate by a waste gate valve, a supercharger of the variable nozzle-type can be used to change the exhaust flow rate and the intake flow rate in a supercharger.

In the above embodiment, it is assumed that each of the target air amount calculating unit 41 and the air amount calculating unit 42 calculates the target intake amount M0 and the intake amount M respectively, but a processor acquiring a target intake air amount and an intake air amount to be introduced into an internal combustion engine is not limited to this. For example, a calculation results of other controllers may be simply acquired.

In the above embodiment, the operation state determining unit 44 determines that the operation state of the vehicle is the accelerating state based on the target supercharging pressure P0 (S2 in FIG. 5), and the feedback control of the supercharging pressure P based on the difference ΔM of the intake amount M is performed (S4 to S6). However, the determination performed by the operation state determining unit 44 is not limited to this. For example, after the accelerating state is determined in S2, it may be further determined in S7 whether or not the operation state of the vehicle is the predetermined light road state in a predetermined time period prior to the transition to the accelerating state. In this instance, the feedback control is performed in S4 to S6 only during acceleration or transition of acceleration in the predetermined time period after the predetermined light road state.

That is, since the in-cylinder temperature decreases in the predetermined time period after the predetermined light road state, and the filling efficiency of the cylinder increases, it is highly likely that an amount of the intake air exceeding the expected amount is introduced into the cylinder 13 at the time of acceleration or at the time of acceleration transition within such a period, resulting in the intake amount M and the output torque T overshoot. The feedback control of the supercharging pressure P based on the difference ΔM between the intake amount M and the target intake amount M0 is limited to such a condition, whereby overshooting of the intake amount M and the output torque T can be suppressed more efficiently.

The above embodiment can be combined as desired with one or more of the above modifications. The modifications can also be combined with one another.

According to the present invention, it becomes possible to suppress overshoot of the engine torque.

Above, while the present invention has been described with reference to the preferred embodiments thereof, it will be understood, by those skilled in the art, that various changes and modifications may be made thereto without departing from the scope of the appended claims.

What is claimed is:

1. A supercharging pressure setting apparatus, comprising:
   an internal combustion engine mounted on a vehicle;
   a supercharger configured to compress an intake air introduced to the engine;
   a supercharger actuator configured to adjust a supercharging pressure of the supercharger to a target supercharging pressure; and
   a processor and a memory coupled to the processor, wherein
   the processor is configured to perform:
      acquiring an intake air amount introduced to the engine;
      acquiring a target intake air amount introduced to the engine;
      setting the target supercharging pressure based on an operation state of the vehicle;
      determining whether the operation state of the vehicle is one of an accelerating state and a transition state to the accelerating state; and
      calculating a difference between the intake air amount and the target intake air amount acquired in the acquiring, wherein
   the processor is configured to perform:
      the setting including setting the target supercharging pressure based on the difference calculated in the calculating when it is determined in the determining that the operation state of the vehicle is one of the accelerating state and the transition state to the accelerating state.

2. The supercharging pressure setting apparatus according to claim 1, wherein
   the processor is configured to perform:
      the determining including determining that the operation state of the vehicle is one of the accelerating state and the transition state to the accelerating state when the target supercharging pressure set in the setting is equal to or higher than a predetermined pressure.

3. The supercharging pressure setting apparatus according to claim 1, further comprising:
   a throttle actuator configured to adjust the intake air amount introduced to the engine, wherein
   the processor is configured to perform:
      controlling the throttle actuator so as to maximize the intake air amount introduced to the engine when it is determined in the determining that the operation state of the vehicle is one of the accelerating state and the transition state to the accelerating state.

4. The supercharging pressure setting apparatus according to claim 1, further comprising:
   a supercharging pressure sensor configured to detect the supercharging pressure of the supercharger, wherein
   the processor is configured to perform:
      starting the setting of the target supercharging pressure based on the difference calculated in the calculating when it is determined in the determining that the operation state of the vehicle is one of the accelerating state and the transition state to the accelerating state and the supercharging pressure detected by the supercharging pressure sensor has reached to a predetermined pressure.

5. The supercharging pressure setting apparatus according to claim 4, wherein
   the processor is configured to perform:
      terminating the setting of the target supercharging pressure based on the difference calculated in the calculating when the difference calculated in the calculating is determined to be within a predetermined range with respect to 0 for a predetermined time period or more after starting the setting of the target supercharging pressure based on the difference calculated in the calculating.

6. The supercharging pressure setting apparatus according to claim 1, wherein
   the processor is configured to perform:
      the determining including determining whether the operation state of the vehicle had been a predetermined low road state in a predetermined time period before transition to the accelerating state; and
      the setting including calculating the target supercharging pressure based on the difference calculated in the calculating when it is determined in the determining that the operation state of the vehicle is one of the accelerating state and the transition state to the accelerating state and the operation state of the vehicle had been the predetermined low road state in the predetermined time period before transition to the accelerating state.

7. The supercharging pressure setting apparatus according to claim 1, wherein
   the processor is configured to perform:
      the setting including setting the target supercharging pressure lower as the difference calculated in the calculating is greater.

8. The supercharging pressure setting apparatus according to claim 7, wherein
   the processor and the supercharger actuator are configured to perform:
      performing PID control of the supercharging pressure of the supercharger based on the difference calculated in the calculating when it is determined in the determining that the operation state of the vehicle is one of the accelerating state and the transition state to the accelerating state.

9. The supercharging pressure setting apparatus according to claim 2, further comprising:
   a supercharging pressure sensor configured to detect the supercharging pressure of the supercharger, wherein
   the processor is configured to perform:
      starting the setting of the target supercharging pressure based on the difference calculated in the calculating when it is determined in the determining that the operation state of the vehicle is one of the accelerating state and the transition state to the accelerating state and the supercharging pressure detected by the supercharging pressure sensor has reached to a predetermined pressure.

10. The supercharging pressure setting apparatus according to claim 9, wherein
    the processor is configured to perform:
       terminating the setting of the target supercharging pressure based on the difference calculated in the calculating when the difference calculated in the calculating is determined to be within a predetermined range with respect to 0 for a predetermined time period or more after starting the setting of the target supercharging pressure based on the difference calculated in the calculating.

11. The supercharging pressure setting apparatus according to claim 3, further comprising:

a supercharging pressure sensor configured to detect the supercharging pressure of the supercharger, wherein the processor is configured to perform:
starting the setting of the target supercharging pressure based on the difference calculated in the calculating when it is determined in the determining that the operation state of the vehicle is one of the accelerating state and the transition state to the accelerating state and the supercharging pressure detected by the supercharging pressure sensor has reached to a predetermined pressure.

12. The supercharging pressure setting apparatus according to claim 11, wherein the processor is configured to perform:
terminating the setting of the target supercharging pressure based on the difference calculated in the calculating when the difference calculated in the calculating is determined to be within a predetermined range with respect to 0 for a predetermined time period or more after starting the setting of the target supercharging pressure based on the difference calculated in the calculating.

* * * * *